US007003892B2

(12) United States Patent
Eaton et al.

(10) Patent No.: US 7,003,892 B2
(45) Date of Patent: Feb. 28, 2006

(54) SPATIAL COORDINATE-BASED METHOD FOR IDENTIFYING WORK PIECES

(75) Inventors: Homer L. Eaton, Carlsbad, CA (US); Douglas P. Schueneman, Allen Park, MI (US)

(73) Assignee: Hexagon Metrology AB, Stockholm (SE)

( * ) Notice: Subject to any disclaimer, the term of this patent is extended or adjusted under 35 U.S.C. 154(b) by 499 days.

(21) Appl. No.: 10/417,420

(22) Filed: Apr. 15, 2003

(65) Prior Publication Data

US 2004/0210553 A1    Oct. 21, 2004

(51) Int. Cl.
*G01B 5/004* (2006.01)

(52) U.S. Cl. .......................................... 33/503; 33/556
(58) Field of Classification Search ............... 33/502, 33/503, 556; 700/115, 215, 225; 702/33; 707/1
See application file for complete search history.

(56) References Cited

U.S. PATENT DOCUMENTS

| 5,521,847 A * | 5/1996 | Ostrowski et al. ............ 33/503 |
| 5,829,148 A * | 11/1998 | Eaton ............................ 33/503 |
| 6,134,506 A * | 10/2000 | Rosenberg et al. ............ 33/503 |
| 6,161,079 A * | 12/2000 | Zink et al. .................... 33/503 |
| 6,493,956 B1 * | 12/2002 | Matsuda ....................... 33/502 |
| 6,598,306 B1 * | 7/2003 | Eaton ............................ 33/503 |
| 2005/0069188 A1 * | 3/2005 | Rubbert et al. .............. 382/128 |

\* cited by examiner

*Primary Examiner*—G. Bradley Bennett
(74) *Attorney, Agent, or Firm*—Wolf, Greenfield & Sacks, P.C.

(57) ABSTRACT

In a method for identifying work pieces based on spatial coordinates. Each of a set of parts to be processed using a multi-axis, articulated spatial measurement arm, are marked with three points defining a distinctive triangle. In a data base, the side lengths of each distinctive triangle is referenced to the part it identifies and to related processing parameters. Before processing a part, the probe of the measurement arm is successively positioned on each of the marked points. Data processing equipment associated with the arm retrieves from the data base the identification of the part and the related parameters.

16 Claims, 2 Drawing Sheets

SPATIAL COORDINATE-BASED METHOD FOR IDENTIFYING WORK PIECES

FIELD OF THE INVENTION

This invention relates to the use of multi-axis, articulated spatial measurement arms of the type disclosed in U.S. Pat. No. 5,829,148 Eaton, which patent is incorporated by reference in this specification.

BACKGROUND OF THE INVENTION

When a work piece is to be processed by an operator with the use of a multi-axis, articulated spatial measurement arm to either measure the spatial coordinate of one or more points on the work piece, or to machine the piece at points located by means of the arm, the work piece must first be identified and the processing parameters must be looked at. In a machine shop environment, limited lighting and a dusty atmosphere may result in a erroneous reading of a part number and the consequential use of wrong processing parameters. The present invention results from an attempt to take full advantage of the precise measurement capability of a spatial measurement device to reduce the risk of erroneous identification and mistaken processing of a work piece.

SUMMARY OF THE INVENTION

The principal and secondary objects of this invention are to provide a precise way to identify work pieces to be processed and retrieve the applicable processing parameters while minimizing human errors and greatly expediting the whole process.

These and other valuable objects are achieved by marking each work piece with at least three points that define a distinctive triangle uniquely assigned to that work piece. In a data base, the characteristics of the triangles such as the length of all three sides, are associated with the work piece identification and the work piece processing parameters. Without having to read any label, engraving or other marking, a operator can quickly identify the piece by applying the probe of the measurement arm to each marked point whose measurements are used by associated data processing equipment to identify the part and retrieve the processing parameters.

DESCRIPTION OF THE PREFERRED EMBODIMENT OF THE INVENTION

Figure 1:
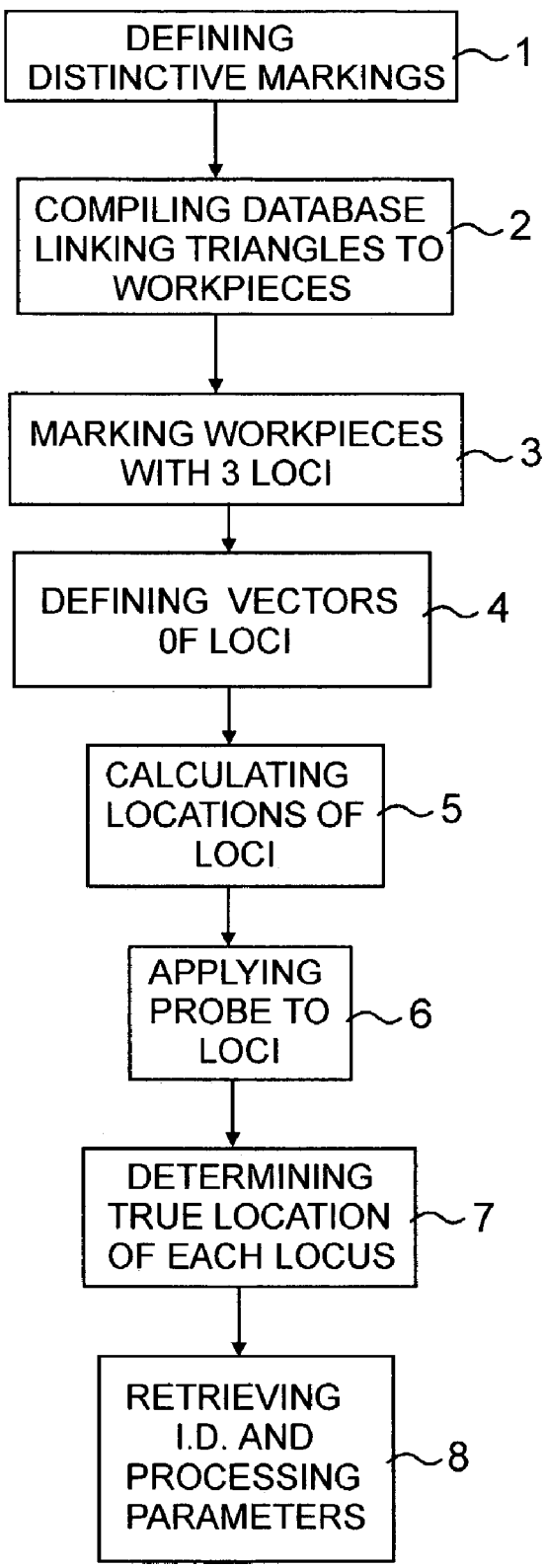
FIG. 1 is a block diagram of the identification method according to the invention.

Referring now to the drawing, there is illustrated in FIG. 1, the various steps which constitute the novel identification method. The process begins by the definition 1 of a plurality of distinctively different triangles which are dimensioned to be conveniently marked on a set of work pieces. Typically, each side of a triangle should be of a length equal to about 100 times the resolution of the measurement arm, it being understood that the larger the triangle that can be accommodated by a work piece, the more precise their measurement will be and, consequently, the more dimensionally close the various triangles can be.

Next, a data base is compiled 2 in which each triangle is referenced to a work piece and to its processing parameters. This referencing can be accomplished by tabulating the three lengths of the triangle sides with the work piece identification number or its literal definition. The processing parameters may be tabulated in the same or an associated data base. These parameters may include the type of measurements or the machining tasks that must be performed on that particular work piece.

Figure 2:
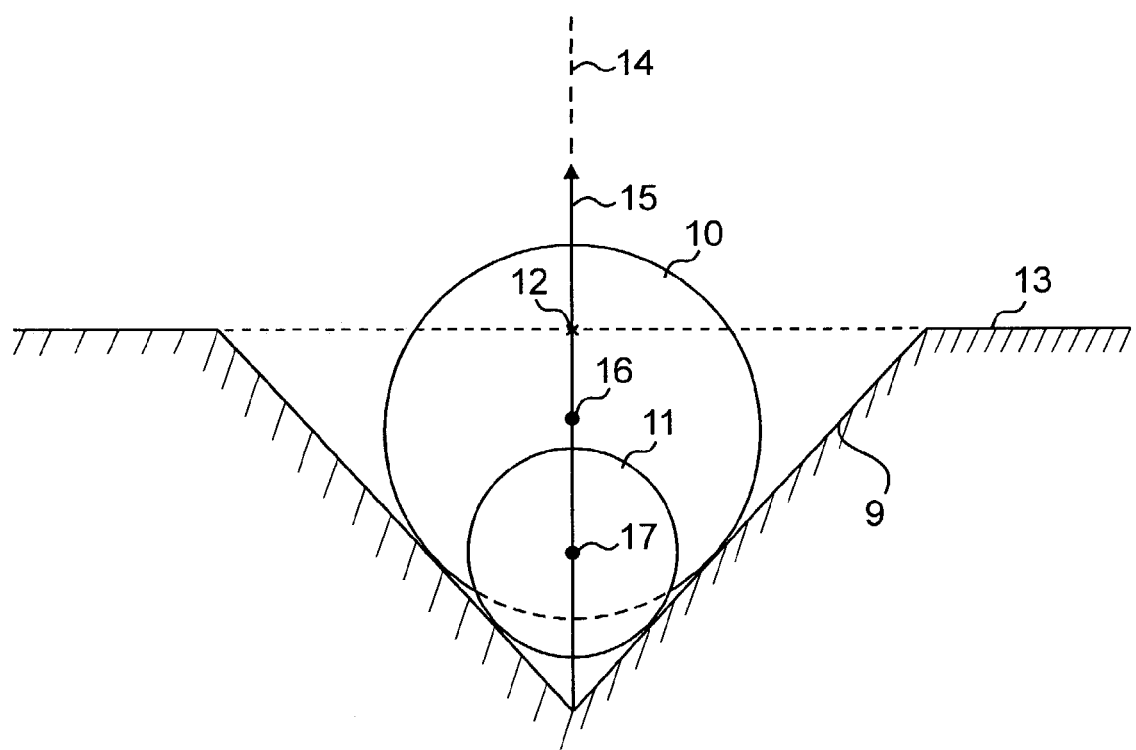
FIG. 2 is a diagram of the orientation vector associated with each point marked on a work piece.

The triangle assigned to each work piece is then applied to it by marking 3 three loci corresponding to the three summits of the triangle. The three loci can be situated on various sides of the work piece. This marking can be accomplished in a variety of ways such as with decals, dimples, painted dots, radiation emitters placed directly on the surface of the work piece or by gluing marked slugs to the desired spots. In the preferred embodiment of the invention, the marking consists in drilling three conical bores or depressions in the surface of the work pieces. As more specifically illustrated in FIG. 2, each conical bore 9, whether drilled directly on the surface of the work piece or on a slug glued to the desired spot, is dimensioned to conveniently accept and nest at least two or more types of spherical probe tips 10, 11 of a measuring arm. In order to compensate for various probe tip diameters or to define the precise location 12 of the marked locus on the surface 13 of the work piece, the orientation, that is the axis 14 of the depression must be determined. It can be understood that the boring process on an arcuate surface may result in slight deviation of the axis 14 from the true perpendicular to the work piece surface 13. The axis of orientation 14 is calculated as a unitary vector 15 by measuring the location of the locus using two spherical probe tips 10, 11 of different diameters. The larger tip will give a measured point at the center of the tip 16 which will be higher, that is further away from the apex of the conical depression than the measurement 17 obtained with the smaller probe tip 11. The two metered points 16, 17 define a line or vector 15 congruent with the axis 14 of the depression. The exact, virtual locus 12 marking the summit of the triangle, can then be readily calculated as a function of the vector 15 using the location of the work piece surface 13, or the respective radii of the tips and the angle and depth of the depression. The same procedure is followed when it becomes necessary to compensate, that is, adjust a locus position that has been determined initially using a tip of a given diameter in any attempt to read that position with a tip of a different diameter.

Before beginning to process a work piece, the operator can identify that work piece by applying the probe of the measurement arm to the three marked loci. An associated data processor can look in the data base to determine 7 the exact location of each measured locus in accordance and as a function of the unitary vector associated with the locus and of the diameter of the probe tip being used. From the measured location of the three loci, the system calculates the length of each side of the triangle and retrieves 8 the identification and the processing parameters from the data base. This identification and parameters can be conveniently displayed or printed for use by the operator.

In cases when the marking depressions do not have a common orientation, their respective vectors should be determined initially and stored in the data base, as part of the identification parameters so that any necessary measurement compensation can be quickly and automatically performed by the system.

Such a measurement compensation becomes necessary when the location of the loci stored in the data base was measured with a probe tip of a different radius than the one currently used.

It should be understood that the marking of the work piece could be limited to two loci in a two-dimensional work surface. When dealing with three-dimensional work pieces, the number of loci can be augmented to define more than one triangle for added precision.

Accordingly, through the use of the claimed method, not only can identification errors be avoided, but the processing of each work piece is greatly expedited since the identification of the work piece, the retrieving of the processing parameters and the processing itself can be done by uninterrupted manipulation of a single instrument.

Once the identity and processing parameters of the work piece have been retrieved, conventional measurements may be done on any part of the piece in reference to a defined situs such as the location of the arm as relatively indicated by the positions of the loci. Alternately, all measurements by the arm may be referenced to the location of the work piece as defined by said loci.

In order to facilitate the treatment of the work pieces, its geometric data are preferably shown on a visual display device as an image corresponding to the mounted positioin of the work piece by combining the three loci measurements with information retrieved from the data base.

While the preferred embodiment of the invention has been described, modifications can be made and other embodiments may be devised without departing from the spirit of the invention and the scope of the appended claims.

What is claimed is:

1. A method for identifying a plurality of work pieces and for defining the locations of a plurality of points on said work pieces using a multi-axis, articulated spatial measurement arm positioned at a situs, wherein said arm has a given reach and includes a probe tip, said method comprising the steps of:
   marking each of said work pieces with at least three loci defining at least one triangle dimensionally different from all the triangles defined by marked loci on any other one of said work pieces;
   compiling a data base linking characteristics of triangles defined on said work pieces with identifications of said work pieces;
   applying said probe tip to said loci on each of said work pieces and measuring locations of said loci; and
   using measured locations to identify each work piece according to said data base.

2. The method of claim 1 which further comprises the steps of:
   measuring by means of said arm, the location of at least one point on one of said work pieces other than said loci; and
   spatially referring said point to said situs.

3. The method of claim 1, wherein said step of marking comprises creating a conical depression having a central axis and a given angle at each one of said loci, said depression being dimensioned to nest said probe tip.

4. The method of claim 3, wherein said step of marking further comprises defining a unique a unitary vector representing the orientation of said central axis.

5. The method of claim 4, wherein said probe tip has a given diamenter and the step of measuring comprises determining the location of each of said loci as a function of said vector and the given diameter of said probe tip.

6. The method of claim 3, wherein said step of creating comprises drilling said depressions into a surface area of said work piece.

7. The method of claim 3, wherein said step of creating comprises mounting on said body slugs having said depressions.

8. The method of claim 1 which further comprises:
   calculating the length of each side of each of said triangles as a function of said measured locations; and
   said step of compiling comprises linking sets of said length to said identifications.

9. The method of claim 1, wherein said step of compiling comprises storing processing parameters relative to said work piece; and
   referencing said parameters to said identification.

10. The method of claim 9 which further comprises automatically retrieving said parameters as a function of said measured locations.

11. The method of claim 4, wherein said step of defining comprises sequentially measuring loci associated with said vector with at least two of said probe tips of different diameters.

12. The method of claim 1 which further comprises spatially referring location of said situs to said loci.

13. The method of claim 1, which further comprises spatially referring locations of said loci to said situs.

14. The method of claim 4, wherein said step of defining said vector comprises measuring the location of said depression firstly, using a first probe tip having a first known radius, and secondly, using a second probe tip having a second known radius different from said first radius; and
   calculating the direction of said vector passing through points defined by said measuring.

15. The method of claim 5, wherein said step of measuring locations of loci further comprises adjusting said measured locations as a function of the radius of said probe tip;
   whereby differences in location measurements resulting from use of probe tips of different radii are automatically compensated.

16. The method of claim 15, wherein said adjusting comprises retrieving said vector from said data base.

* * * * *